(12) United States Patent
Roberts et al.

(10) Patent No.: US 6,510,258 B1
(45) Date of Patent: Jan. 21, 2003

(54) INTEGRATED CHIP OPTICAL DEVICES

(75) Inventors: Stephen William Roberts, Winchester (GB); John Paul Drake, Lambourn (GB)

(73) Assignee: Bookham Technology PLC, Oxfordshire (GB)

(*) Notice: Subject to any disclaimer, the term of this patent is extended or adjusted under 35 U.S.C. 154(b) by 163 days.

(21) Appl. No.: 09/688,349

(22) Filed: Oct. 16, 2000

(30) Foreign Application Priority Data

Oct. 15, 1999 (GB) .............................................. 9924511

(51) Int. Cl.⁷ .............................. G02B 6/12; H01L 21/00
(52) U.S. Cl. .............................. 385/14; 385/12; 385/88; 438/29
(58) Field of Search .............................. 385/14, 49, 50, 385/25, 41–46, 52, 88, 12; 438/29–30

(56) References Cited

U.S. PATENT DOCUMENTS

| | | | |
|---|---|---|---|
| 4,930,854 A | * 6/1990 | Albares et al. | ................ 385/49 |
| 5,073,002 A | 12/1991 | Hockaday | .................... 385/49 |
| 5,444,805 A | 8/1995 | Mayer | ......................... 385/49 |
| 6,163,632 A | * 12/2000 | Rickman et al. | ............... 385/14 |
| 2002/0127754 A1 | * 9/2002 | Kaneko et al. | ................ 438/29 |

FOREIGN PATENT DOCUMENTS

| | | |
|---|---|---|
| EP | 0 170 457 | 2/1986 |
| EP | 0652451 A1 | 5/1995 |
| FR | 2766930 | 2/1999 |
| GB | 2 268 813 | 1/1994 |
| JP | 002156647 | 4/1991 |
| JP | 03084523 | 4/1991 |

OTHER PUBLICATIONS

Bernd Schuppert et al.; "Integrated Optics in Si and SiGe-–Heterostructures"; Sep. 27, 1992; pp. 793–800.

* cited by examiner

Primary Examiner—Georgia Epps
Assistant Examiner—M. Hasan
(74) Attorney, Agent, or Firm—Sughrue Mion, PLLC

(57) ABSTRACT

A method of forming an integrated chip optical device as a protective layer formed over part of the face of the chip on which at least one optical waveguide is formed, and the protective coating is selectively removed leaving the coating over an edge region 18 and the edge of the device is polished to provide high edge quality against which offchip optical fibers may be abutted.

15 Claims, 1 Drawing Sheet

INTEGRATED CHIP OPTICAL DEVICES

The invention relates to integrated chip optical devices and is particularly related to such devices where optical components including at least one waveguide are formed on a substrate.

BACKGROUND OF THE INVENTION

In order to make external optical connections to such an integrated chip optical device, it may be required to join off chip optical fibres to waveguides onchip adjacent an edge of the chip. To achieve satisfactory optical function at such a junction it is desirable that the chip has high edge quality where any such junction is to be formed.

It is an object of the present invention to provide an improved method of forming an integrated chip optical device as well as an improved device, having high edge quality for such external optical junctions.

SUMMARY OF THE INVENTION

The invention provides a method of forming an integrated chip optical device comprising forming a plurality of optical components on a substrate including at least one waveguide extending over a surface of the substrate to an edge of the device, forming a protective layer over at least part of said surface including an edge region in which said edge is located, selectively removing the protective coating from certain regions of said surface while leaving the protective coating over said edge region, and polishing the edge of the device in said edge region to provide high edge quality enabling said waveguide to be abutted against and joined to an offchip optical fibre.

Preferably said protective coating comprises a hard setting photoresist.

Preferably said protective coating is spun over the surface of the chip.

Preferably the protective coating is selectively removed using photolithography techniques.

Preferably a plurality of waveguides extend to said edge and each is secured to an offchip optical fibre.

Preferably each said waveguide is secured to an offchip fibre by adhesive with the fibre abutting the respective waveguide at said edge.

Preferably said edge is polished at an angle of inclination to the surface of the chip so as to reduce reflections at the edge passing along the waveguide or fibre.

In some embodiments said protective coating is removed from regions of the chip on which optical components are formed so as to leave said optical components uncovered by the protective layer.

The invention also provides an integrated chip optical device comprising a plurality of optical components on a substrate including at least one waveguide extending over a surface of the substrate to an edge of the device, a protective layer being formed selectively over part of the surface of the chip adjacent an edge region in which said edge is located, said edge being polished to provide a high edge quality thereby forming a junction face at the edge of the chip for abutting said waveguide to an offchip optical fibre.

Preferably said edge is polished at an angle of inclination to the surface of the chip so that the external face of the waveguide is not perpendicular to the length of the waveguide.

Preferably one or more offchip optical fibres abut a respective waveguide at said edge and are secured thereto by adhesive.

DESCRIPTION OF THE PREFERRED EMBODIMENT

Figure 1:
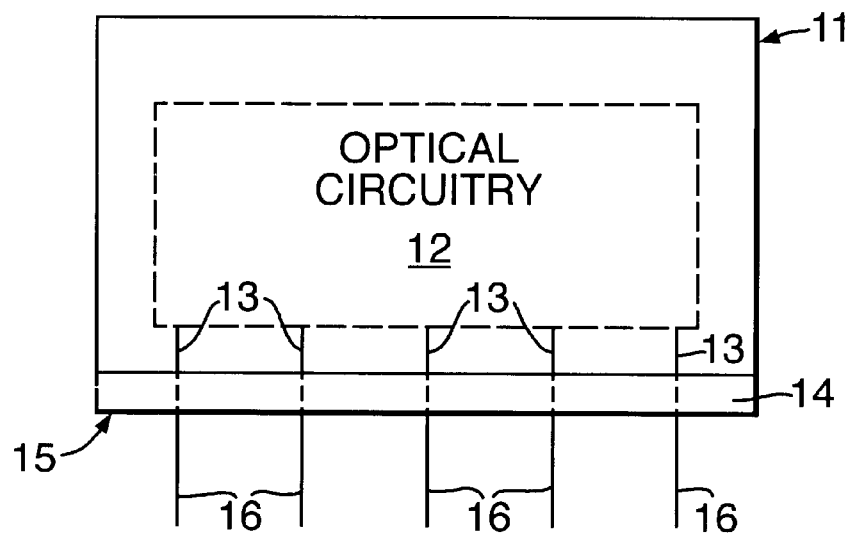
FIG. 1 is a schematic plan view of an integrated chip optical device in accordance with the present invention.

FIG. 1 illustrates an integrated chip optical device such as a silicon chip waveguide device. Such a device may be formed on an integrated silicon substrate having a plurality of optical components formed integrally on the chip including a plurality of optical waveguides formed on the surface of the chip. In this example the chip is indicated at 11 and has a plurality of optical circuit devices 12 of known type. These optical devices may be connected by optical waveguides 13 to an edge region 14 extending along one edge 15 of the chip 11. The construction of the optical circuitry 12 and the waveguides 13 is of known type. In order to make external connections for the chip, the waveguides 13 each have an exposed end face adjacent the edge 15 and they abut respective optical fibres 16 at the edge 15.

In order to provide good optical operation it is required that the edge 15 has a high edge quality where the ends of the waveguides 13 abut end faces of the fibres 16.

Figure 2:
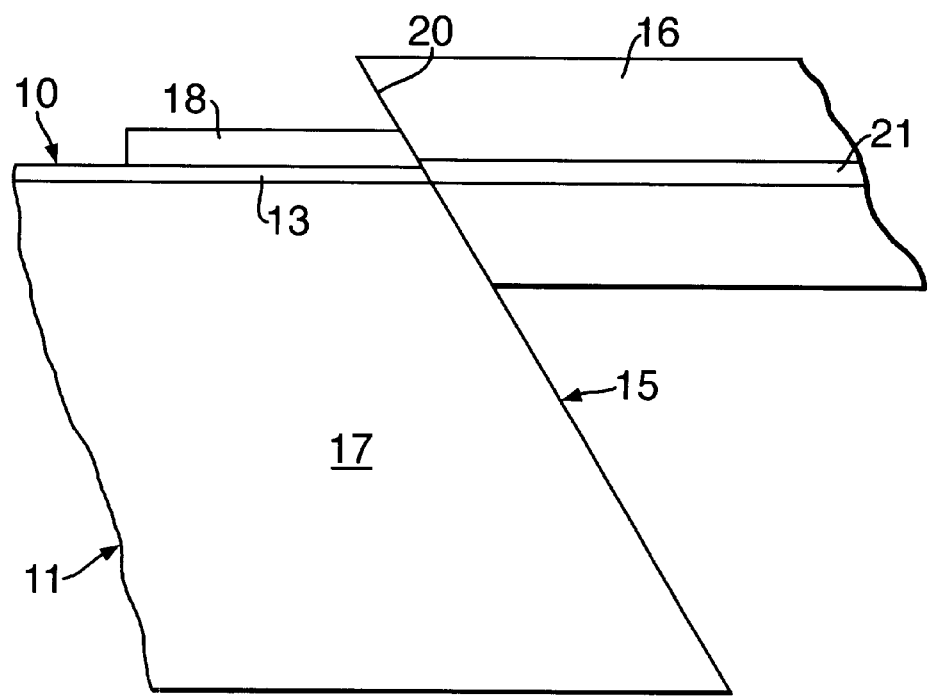
FIG. 2 shows on an enlarged scale a junction between one optical fibre and one waveguide in the device of FIG. 1.

To provide the high edge quality, the chip 11 has over its surface a spun-on coating of a hard setting photoresist after the optical circuitry 12 and waveguides 13 have been formed on the chip. The protective coating is patterned by photolithography so as to remove the protective coating from unwanted areas of the chip surface while leaving the protective coating along the edge region 14 up to the edge 15. In this way the protective coating only covers the edge region and the waveguide ends adjacent the edge 15. The optical circuitry 12 is now uncovered so that the optical circuitry is not effected by any unwanted stresses that may be caused by leaving a protective coating over the optical components formed in the circuitry 12. After selective removal of the protective coating the edge 15 together with the protective coating in the edge region 14 is polished to give a high edge quality with high quality optical properties. This is illustrated in more detail in the enlarged view of FIG. 2. In this Figure the chip 11 has a substrate 17 which may be silicon, with a waveguide 13 extending to the edge 15. The waveguide is covered by the protective coating 18 extending as a strip along the edge region 14. The edge 15 including the end of the waveguide 13 and the edge of the protective coating 18 are polished at an inclined angle relative to the surface and plane of the chip 11 so as to avoid the end face 15 being perpendicular to the plane of the chip. The optical fibre 16 has a similar inclined end face 20 and as illustrated in FIG. 2, the core 21 of the optical fibre 16 is aligned in abutting contact with the end face of the waveguide 13. By use of an inclined face, there is reduction of any reflection at the junction being passed along the waveguide 13 or optical fibre 16.

Although FIG. 2 illustrates only one optical fibre, it will be understood that optical fibres will be abutted against each of the waveguide outlets from the device shown in FIG. 1 and each fibre will be secured by adhesive in abutting contact with the highly polished end face 15 in alignment with the respective waveguide 13.

The use of the protective coating 18 over the edge region 14 of the surface allows a high quality edge to be formed on the chip by polishing without damaging the structure of the waveguide where their ends reach the edge 15 of the chip.

References to the surface of the chip refer to the major face of the chip indicated at 10 in FIG. 2.

The above example may be a silicon on insulator rib waveguide device.

The invention is not limited to the details of the foregoing example.

What is claimed is:

1. A method of forming an integrated chip optical device comprising:

(a) forming a plurality of optical components on a substrate including at least one waveguide extending over a surface of the substrate to an edge of the device, (b) forming a protective coating over at least part of said surface including a surface region adjacent said edge to cover a portion of said at least one waveguide directly adjacent to said edge, (c) selectively removing the protective coating from certain areas of said surface while leaving the protective coating over said surface region adjacent said edge, and (d) after step (c), polishing the edge of the device adjacent the coating to provide high edge quality enabling said waveguide to be abutted against and joined to an offchip optical fibre.

2. A method according to claim 1 in which said protective coating comprises a hard setting photoresist.

3. A method according to claim 1 in which said protective coating is spun over the surface of the chip.

4. A method according to claim 1 in which the protective coating is selectively removed using photolithography techniques.

5. A method according to claim 1 in which a plurality of waveguides extend to said edge and each waveguide is secured to an offchip optical fibre.

6. A method according to claim 5 in which each said waveguide is secured to an offchip fibre by adhesive with the fibre abutting the respective waveguide at said edge.

7. A method according to claim 1 in which said edge is polished at an angle of inclination to the surface of the chip so as to reduce reflections at the edge passing along the waveguide or fibre.

8. A method according to claim 1 in which said protective coating is removed from regions of the chip on which certain optical components are formed so as to leave said certain optical components uncovered by the protective layer.

9. An integrated chip optical device comprising a plurality of optical components on a substrate including at least one waveguide extending over a surface of the substrate to an edge of the device, a protective coating of a polymer being formed over an edge region of the said surface of the chip directly adjacent to said edge to cover the portion of said at least one waveguide directly adjacent to said edge, said edge then being polished to provide a high edge quality adjacent said protective coating thereby forming a junction face at said edge of the chip for abutting said waveguide to an offchip optical fibre.

10. An integrated chip optical device as claimed in claim 9 in which said edge is polished at an angle of inclination to the surface of the chip so that the external face of the waveguide is not perpendicular to the length of the waveguide.

11. An integrated chip optical device according to claim 9 in which one or more offchip optical fibres abut a respective waveguide at said edge and are secured thereto by adhesive.

12. An integrated chip optical device according to claim 9 comprising a silicon on insulator rib waveguide device.

13. A method of forming an integrated chip optical device comprising:

forming a plurality of optical components on a substrate including at least one waveguide extending over a surface of the substrate to an edge of the device, forming a protective coating of a polymer over at least part of said surface including a surface region adjacent said edge to cover a portion of said at least one waveguide directly adjacent to said edge, and then polishing said edge of the device adjacent the coating to provide high edge quality enabling said waveguide to be abutted against and joined to an offchip optical fibre.

14. A method of forming an integrated chip optical device comprising:

forming a plurality of optical components on a substrate including at least one waveguide extending over a surface of the substrate to an edge of the device, forming a protective coating of a hard-setting photoresist over at least part of said surface including a surface region adjacent said edge, to cover a portion of said at least one waveguide directly adjacent to said edge, and then polishing said edge of the device adjacent the coating to provide high edge quality enabling said waveguide to be abutted against and joined to an offchip optical fibre.

15. An integrated chip optical device comprising: a plurality of optical components on a substrate including at least one waveguide extending over a surface of the substrate to an edge of the device, a protective coating of a hard-setting photoresist being formed over an edge region of the said surface of the chip directly adjacent to said edge to cover the portion of said at least one waveguide directly adjacent to said edge said edge, said edge then being polished to provide a high edge quality adjacent said protective coating thereby forming a junction face at said edge of the chip for abutting said waveguide to an offchip optical fibre.

\* \* \* \* \*